(12) United States Patent
Singh

(10) Patent No.: US 11,733,837 B2
(45) Date of Patent: Aug. 22, 2023

(54) UNIFIED DISPLAY FOR VIRTUAL RESOURCES

(71) Applicant: Citrix Systems, Inc., Fort Lauderdale, FL (US)

(72) Inventor: Manbinder Pal Singh, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/881,323

(22) Filed: Aug. 4, 2022

(65) Prior Publication Data

US 2022/0374112 A1 Nov. 24, 2022

Related U.S. Application Data

(63) Continuation of application No. 17/492,240, filed on Oct. 1, 2021, now Pat. No. 11,435,879, which is a continuation of application No. 16/017,368, filed on Jun. 25, 2018, now Pat. No. 11,163,424.

(51) Int. Cl.
| | |
|---|---|
| *G06F 3/0483* | (2013.01) |
| *H04L 67/02* | (2022.01) |
| *G06F 3/0484* | (2022.01) |
| *H04L 67/141* | (2022.01) |
| *H04L 67/01* | (2022.01) |

(52) U.S. Cl.
CPC ............ *G06F 3/0483* (2013.01); *H04L 67/02* (2013.01); *G06F 3/0484* (2013.01); *H04L 67/01* (2022.05); *H04L 67/141* (2013.01)

(58) Field of Classification Search
CPC .................................................. G06F 3/048–05
See application file for complete search history.

(56) References Cited

U.S. PATENT DOCUMENTS

| | | | |
|---|---|---|---|
| 6,532,448 B1 * | 3/2003 | Higginson | G06Q 30/0236 705/14.39 |
| 8,225,191 B1 * | 7/2012 | Kalman | G06F 16/954 715/201 |
| 8,321,798 B2 * | 11/2012 | Abuelsaad | G06F 16/9535 715/760 |

(Continued)

OTHER PUBLICATIONS

"Protect your network from browser-based attacks by isolating web browsing activities" Citrix https://www.citrix.com/virtualization/secure-browser.html website visited May 29, 2018, pp. 1-4.

(Continued)

*Primary Examiner* — Daniel Rodriguez

(57) ABSTRACT

Methods and systems for unifying display of virtual resources are described herein. A virtual session between a client device and a server device may be established. During the virtual session, a user may request, via the client device, to access a uniform resource locator (URL) via a browser associated with the server device. The URL request may be redirected. For example, the client device may receive, from the server device, a request to access the URL via a different browser. The client device may determine another browser with which to access the URL, and the URL may be launched via the other browser. The client device may generate a unified display of the URL launched via the other browser and one or more other URLs.

20 Claims, 10 Drawing Sheets

(56) References Cited

U.S. PATENT DOCUMENTS

| | | | | |
|---|---|---|---|---|
| 8,412,766 B1* | 4/2013 | Meymann | H04L 67/535 | 709/219 |
| 8,726,337 B1* | 5/2014 | Curry | H04L 63/20 | 713/168 |
| 9,509,783 B1* | 11/2016 | Hayden | H04L 67/14 | |
| 10,198,410 B2* | 2/2019 | Zhou | G06F 11/0709 | |
| 2003/0204815 A1* | 10/2003 | Edwards | G06F 16/957 | 707/E17.119 |
| 2004/0024843 A1* | 2/2004 | Smith | G06F 9/451 | 709/219 |
| 2006/0010134 A1* | 1/2006 | Davis | H04L 63/104 | |
| 2007/0266342 A1* | 11/2007 | Chang | G06F 16/9535 | 715/810 |
| 2009/0037829 A1* | 2/2009 | Sun | G06Q 30/06 | 709/201 |
| 2010/0107222 A1* | 4/2010 | Glasser | H04L 63/168 | 726/3 |
| 2010/0218106 A1* | 8/2010 | Chen | G06F 16/957 | 715/738 |
| 2011/0029405 A1* | 2/2011 | Cronin | G06Q 30/08 | 707/748 |
| 2011/0083076 A1* | 4/2011 | Kang | G06F 9/4415 | 715/781 |
| 2011/0178867 A1* | 7/2011 | King | G06Q 30/02 | 705/14.44 |
| 2012/0054744 A1* | 3/2012 | Singh | G06F 21/6218 | 718/1 |
| 2012/0179743 A1* | 7/2012 | Sullivan | H04L 43/08 | 709/203 |
| 2012/0179744 A1* | 7/2012 | Sullivan | H04L 67/02 | 709/203 |
| 2012/0192063 A1* | 7/2012 | Koren | G06F 16/9577 | 715/252 |
| 2012/0331406 A1* | 12/2012 | Baird | G06F 16/95 | 715/760 |
| 2013/0174267 A1* | 7/2013 | Kass | H04L 63/1441 | 726/26 |
| 2014/0108496 A1* | 4/2014 | Heller | G06F 16/951 | 709/203 |
| 2014/0280482 A1* | 9/2014 | Crosley | G06F 16/958 | 709/203 |
| 2015/0156203 A1* | 6/2015 | Giura | H04L 63/0281 | 726/4 |
| 2015/0193394 A1* | 7/2015 | Peters | G06F 16/9574 | 715/234 |
| 2015/0200829 A1* | 7/2015 | Dubroy | H04L 67/535 | 709/224 |
| 2016/0154539 A1* | 6/2016 | Buddhiraja | G06F 9/45558 | 715/738 |
| 2016/0164946 A1* | 6/2016 | Bazzi | G06F 21/6263 | 709/219 |
| 2016/0313880 A1* | 10/2016 | Godewyn | H04L 67/306 | |
| 2017/0034127 A1* | 2/2017 | Singleton, IV | H04L 61/2503 | |
| 2017/0078406 A1* | 3/2017 | Ruge | H04L 67/02 | |
| 2017/0249069 A1* | 8/2017 | Zamir | G06F 9/461 | |
| 2017/0339250 A1* | 11/2017 | Momchilov | H04L 67/34 | |
| 2018/0089207 A1* | 3/2018 | Matsui | G06F 16/951 | |
| 2018/0165059 A1* | 6/2018 | Agarwal | G06F 3/0483 | |
| 2020/0042568 A1* | 2/2020 | Zeng | G06F 16/9566 | |

OTHER PUBLICATIONS

"Local App Access and URL redirection" Citrix https://docs.citrix.com/en-us/xenapp-and-xendesktop/7-6/xad-build-new-environment/xad-laa-intro.html Sep. 9, 2015, pp. 1-6.

* cited by examiner

UNIFIED DISPLAY FOR VIRTUAL RESOURCES

CROSS-REFERENCE TO RELATED APPLICATIONS

This application claims priority to U.S. patent application Ser. No. 17/492,240, filed Oct. 1, 2021 and entitled "UNIFIED DISPLAY FOR VIRTUAL RESOURCES," which claims priority to U.S. patent application Ser. No. 16/017,368, filed Jun. 25, 2018 and entitled "UNIFIED DISPLAY FOR VIRTUAL RESOURCES." The prior applications are herein incorporated by reference in their entireties for all purposes.

FIELD

Aspects described herein generally relate to computer networking and virtual resources. More specifically, aspects described herein relate to accessing virtual resources from different locations and unifying display of the virtual resources and/or local resources.

BACKGROUND

Users may access virtual resources by connecting their device to a server hosting the virtual resources (or otherwise having access to the virtual resources). For example, web resources (e.g., webpages and websites) may be made available to a user via a virtual browser of the server. The user may access various webpages and/or websites using the virtual browser. The user may also access local resources from their device or resources from other locations, which may be remote from the user's device. Content from different locations may be presented on a display of the user's display device. However, presentation of content from different locations may inefficiently use a large portion of the device's display area, or may be presented on the user's display device as separate windows. Moreover, when the user's device disconnects from the server, one or more of the resources accessed by the user's device may be lost.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, apparatuses, computer-readable media, memory, and methods for unifying display of virtual resources. A method may comprise launching a virtual session between a client device and a server device. After launching the virtual session between the client device and the server device, the client device may send, to the server device and via a virtual channel, a request to access a uniform resource locator (URL) via a browser associated with the server device. The client device may receive, from the server device, a request to access the URL via a browser different from the browser associated with the server device. The client device may determine a second browser with which to access the URL. The second browser may be different from the browser associated with the server device. The URL may be launched via the second browser. The client device may receive information for generating one or more images corresponding to the URL launched via the second browser. Based on the information for generating one or more images corresponding to the URL launched via the second browser, the client device may generate a unified display of the URL launched via the second browser and one or more URLs launched via the browser associated with the server device.

In some examples, receiving the request to access the URL via the browser different from the browser associated with the server device may be based on a determination that the URL is not permitted to be accessed via the browser associated with the server device. Additionally or alternatively, the request to access the URL via a browser different from the browser may indicate the URL and a mode of access for the URL. For example, the mode of access for the URL may comprise accessing the URL via a tab of the browser associated with the server device or via a window of the browser associated with the server device.

In some examples, the client device may send, to the server device, a request to modify one or more characteristics of a browser window of the browser associated with the server device or a browser tab of the browser associated with the server device. Based on the request to modify the one or more characteristics, the client device or server device may cause storage, in a data store associated with the virtual session, an indication of the modification to one or more characteristics of the browser window of the browser associated with the server device or the browser tab of the browser associated with the server device.

In some examples, determining the second browser with which to access the URL may be based on graphics requirements associated with the URL. The browser associated with the server device may comprise a virtual browser executing on the server device. The second browser may comprise a local browser executing on the client device or a secured browser executing in a virtual session different from the virtual session between the client device and the server device.

In some examples, the request to access the URL via the browser associated with the server device may comprise a request to access the URL via a browser tab of the browser associated with the server device. Generating the unified display may comprise causing display, in the browser tab of the browser associated with the server device, of content associated with the URL launched via the second browser.

In some examples, the client device may cause storage, in a data store associated with the virtual session, an indication of the URL launched via the second browser and state information for the URL launched via the second browser. The state information for the URL may indicate, for example, one or more of a browser tab or a browser window used to display content associated with the URL launched via the second browser. In some examples, the client device may be reconnected to the virtual session. Based on data from the data store associated with the virtual session, the URL may be launched via the second browser, and the one or more URLs may be launched via the browser associated with the server device. Also based on data from the data store associated with the virtual session, a unified display of the URL launched via the second browser and the one or more URLs launched via the browser associated with the server device may be generated.

In some examples, the client device may reconnect to the virtual session. However, the URL might not be launched via the second browser. For example, based on a determination that graphics capabilities of the second browser do not satisfy graphics requirements for the URL, the URL may be launched via a third browser different from the second browser. The one or more URLs may be launched via the browser associated with the server device. Also based on data from the data store associated with the virtual session, a unified display of the URL launched via the third browser and the one or more URLs launched via the browser associated with the server device may be generated.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards methods and systems for unifying display of virtual resources. A virtual session between a client device and a server device may be established. During the virtual session, a user may request, via the client device, to access a uniform resource locator (URL) via a browser associated with the server device. The URL request may be redirected if, for example, the URL is not permitted to be launched via the browser associated with the server device. The client device may receive, from the server device, a request to access the URL via a different browser. The client device may determine another browser with which to access the URL, and the URL may be launched via the other browser. For example, the other browser may comprise a local browser or a virtual browser different from the browser associated with the server device. The client device may generate a unified display of the URL launched via the other browser and one or more other URLs, such as URLs launched via the browser associated with the server device or launched via other browsers.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
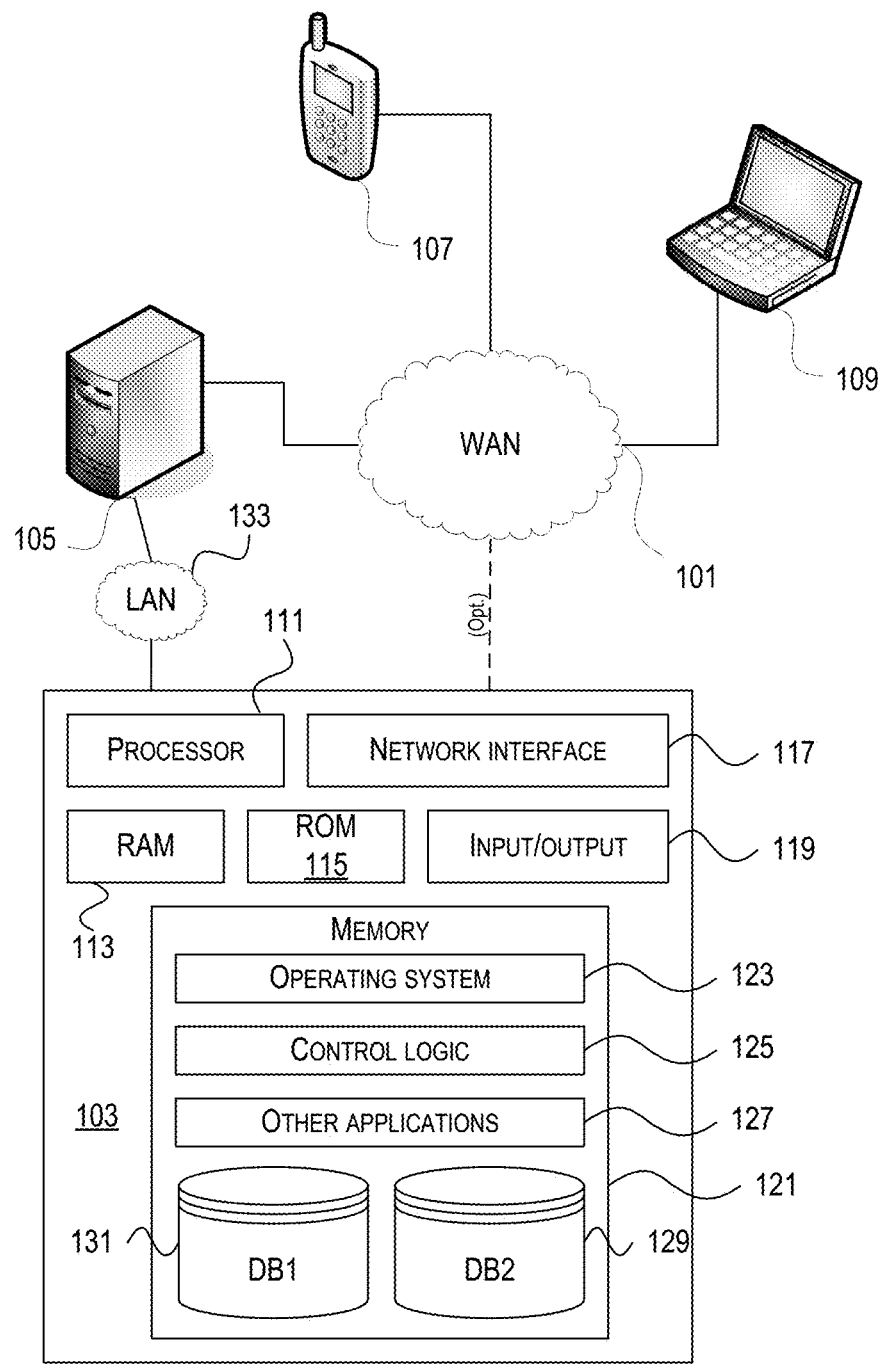
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
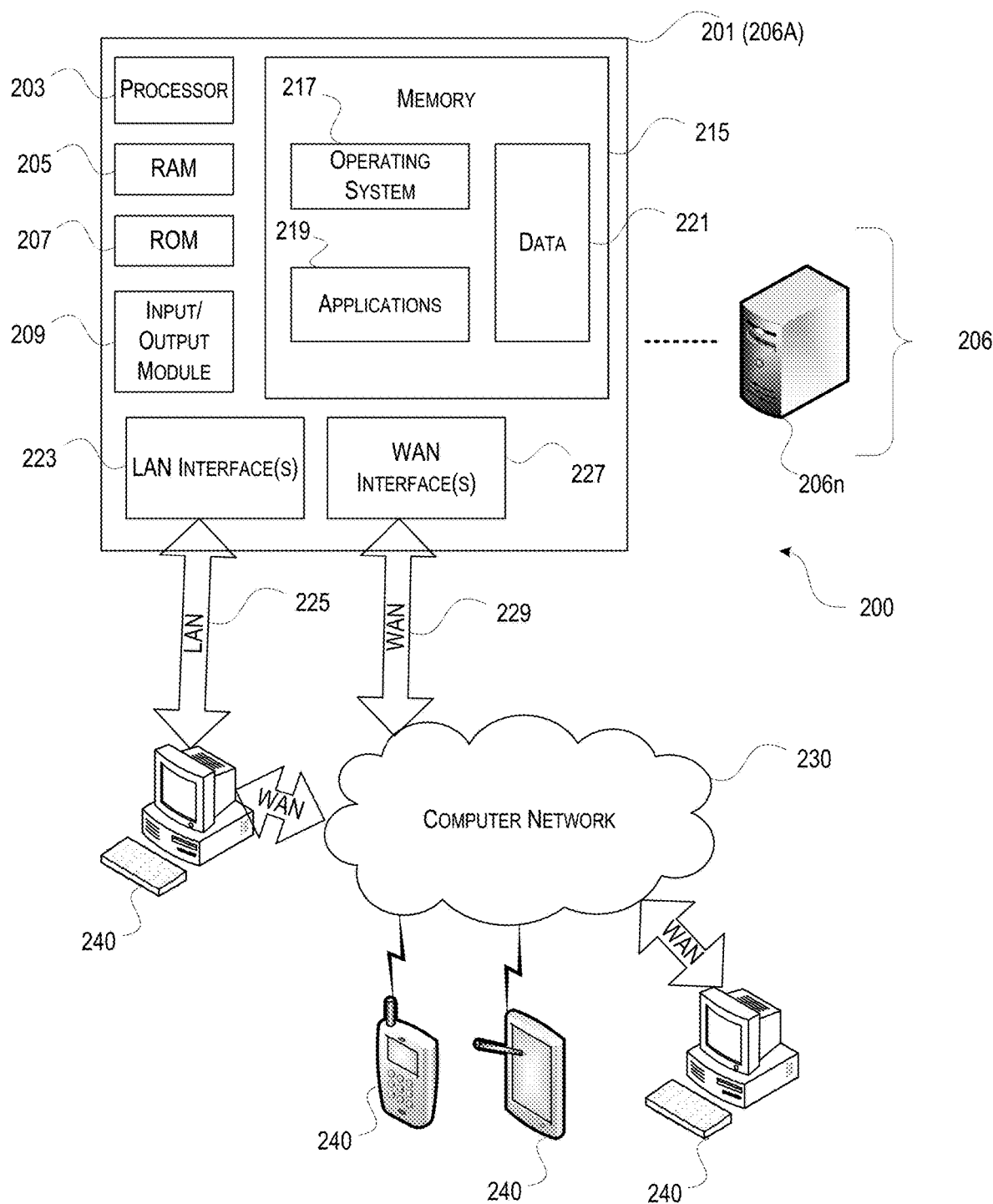
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206*b* (not shown.) First server 206*a* may acquire an enumeration of applications available to the client machine 240 as well as address information associated with an application server 206 hosting an application identified within the enumeration of applications. First server 206*a* can then present a response to the client's request using a web interface, and communicate directly with the client 240 to provide the client 240 with access to an identified application. One or more clients 240 and/or one or more servers 206 may transmit data over network 230, e.g., network 101.

Figure 3:
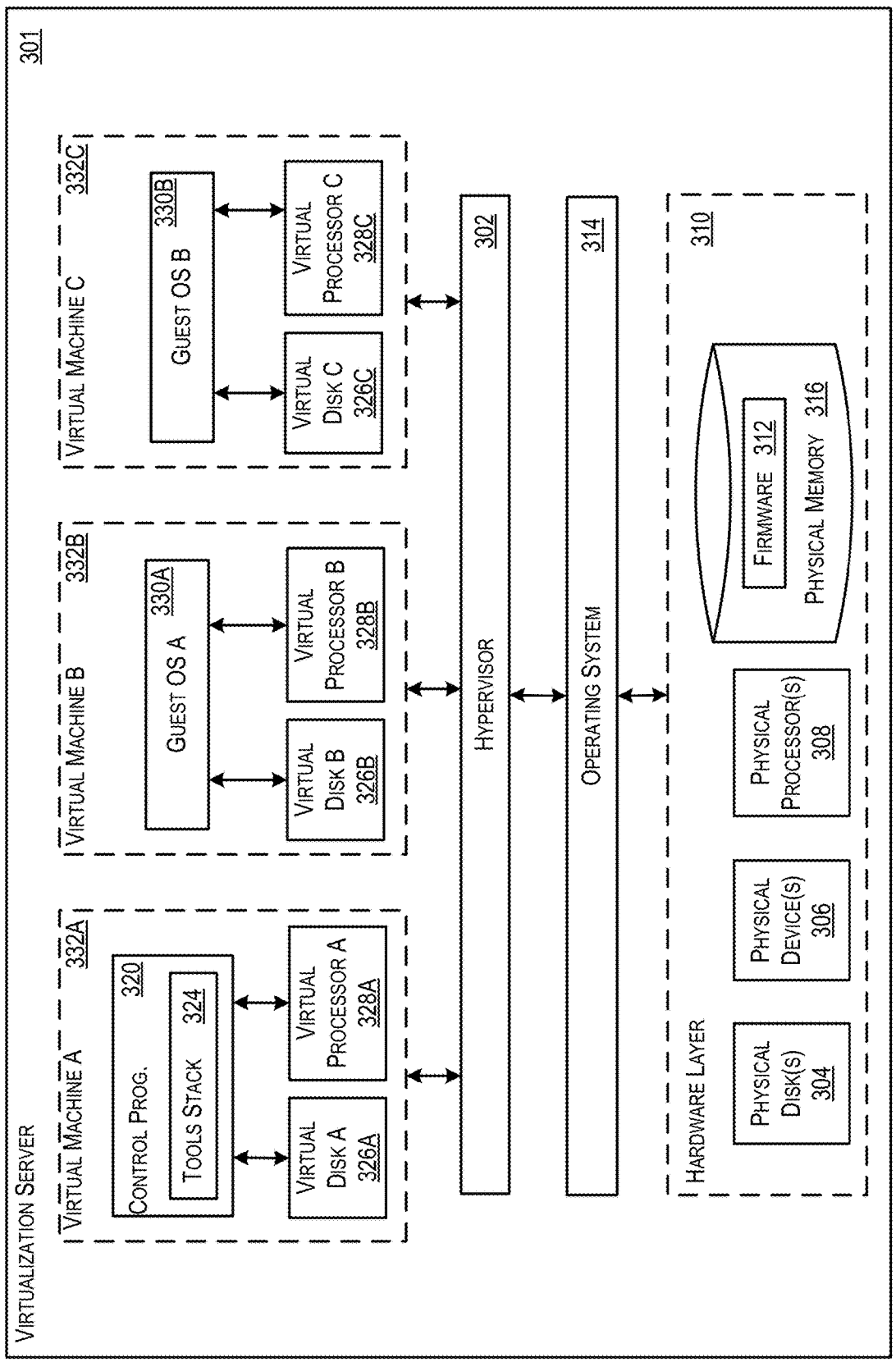
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
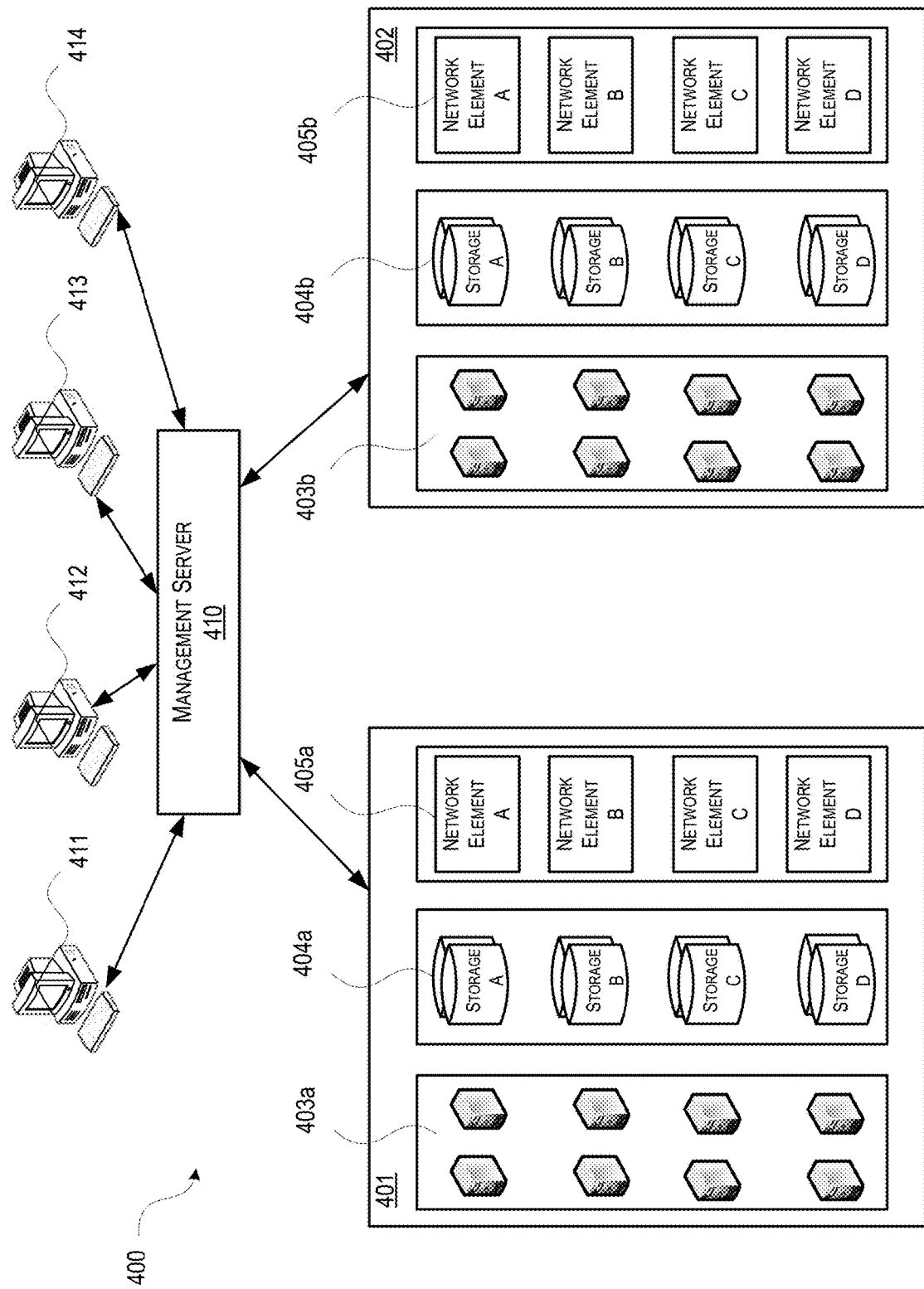
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
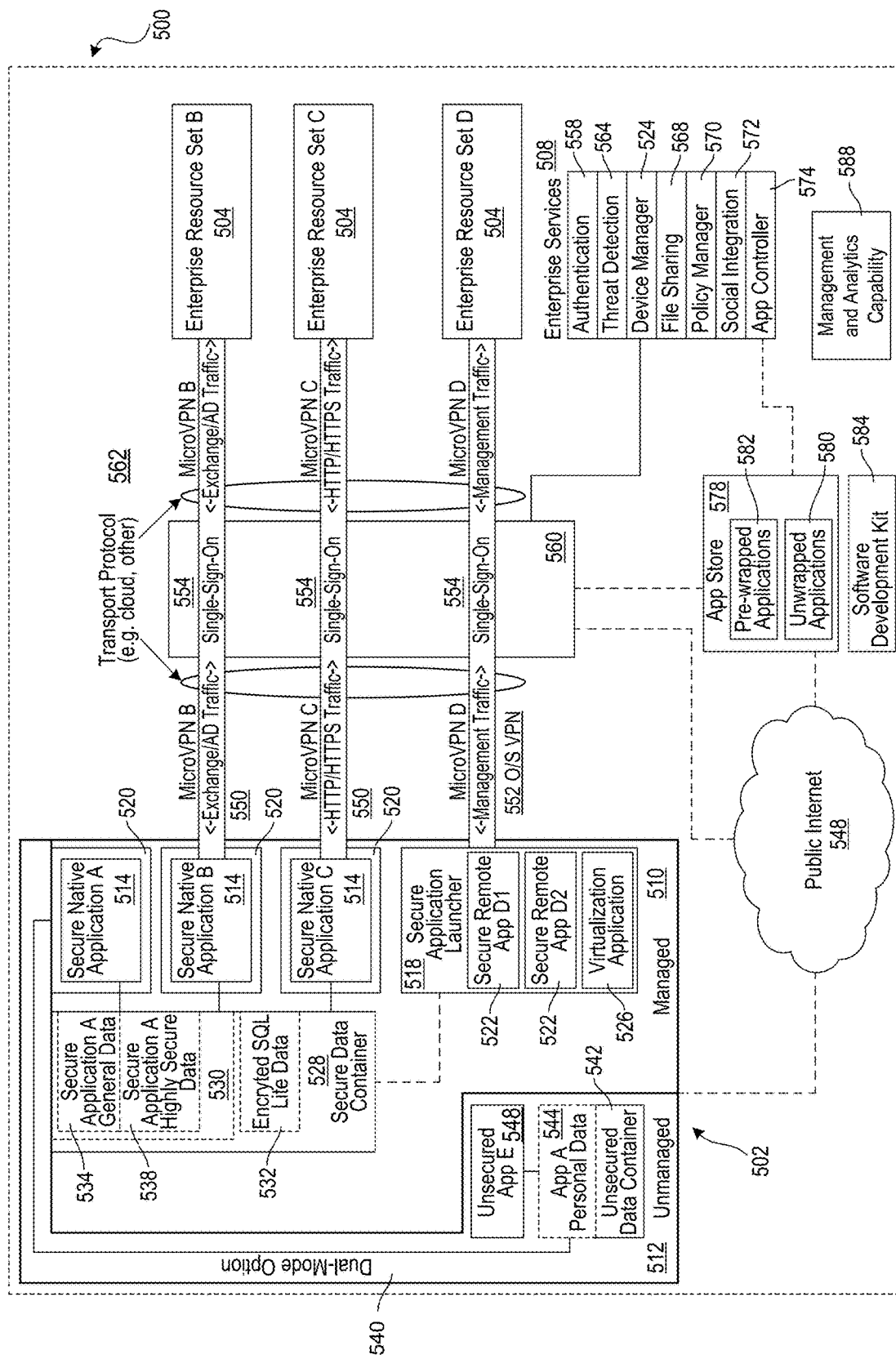
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
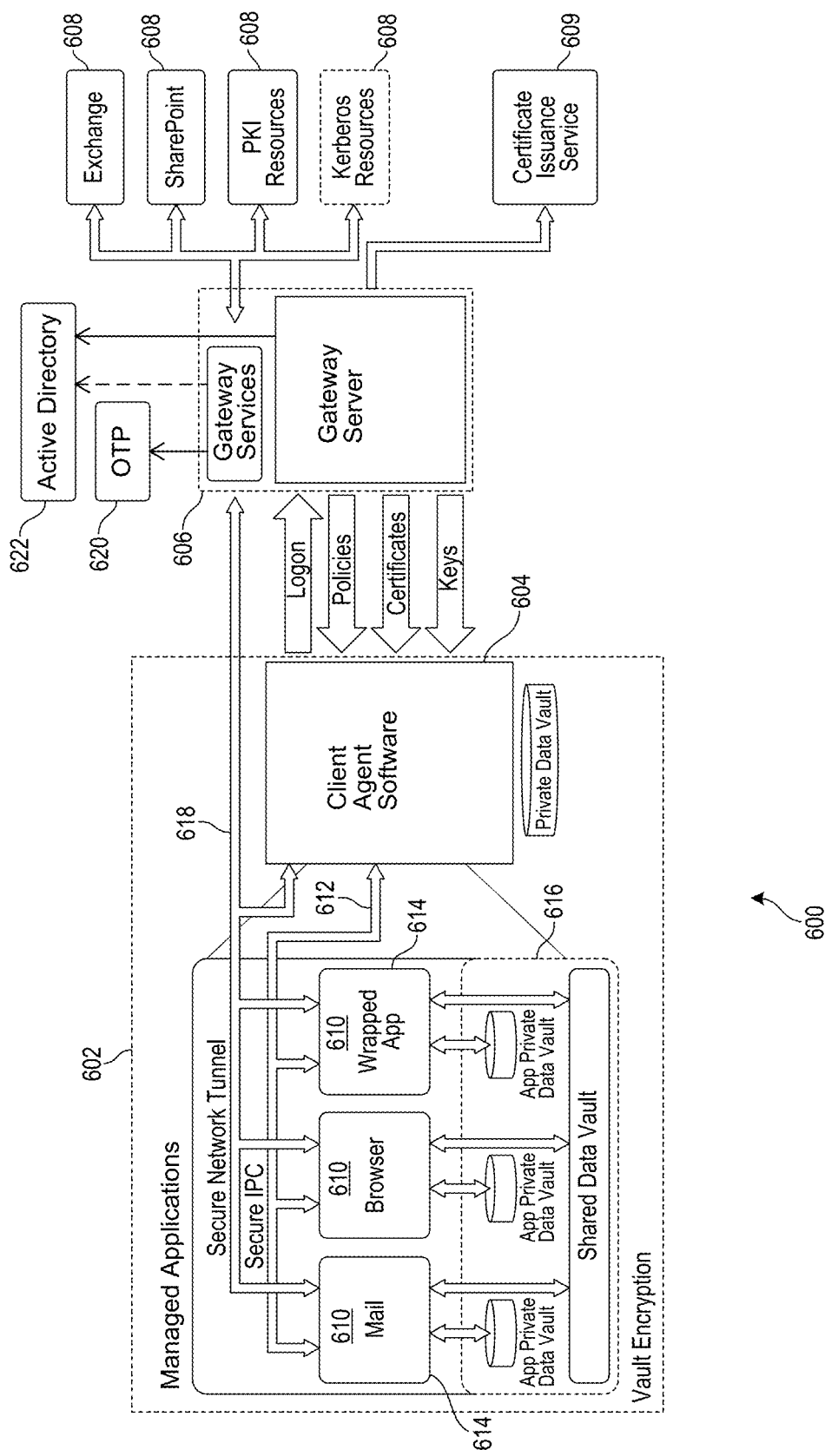
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Unified Display for Virtual Resources

Figure 7:
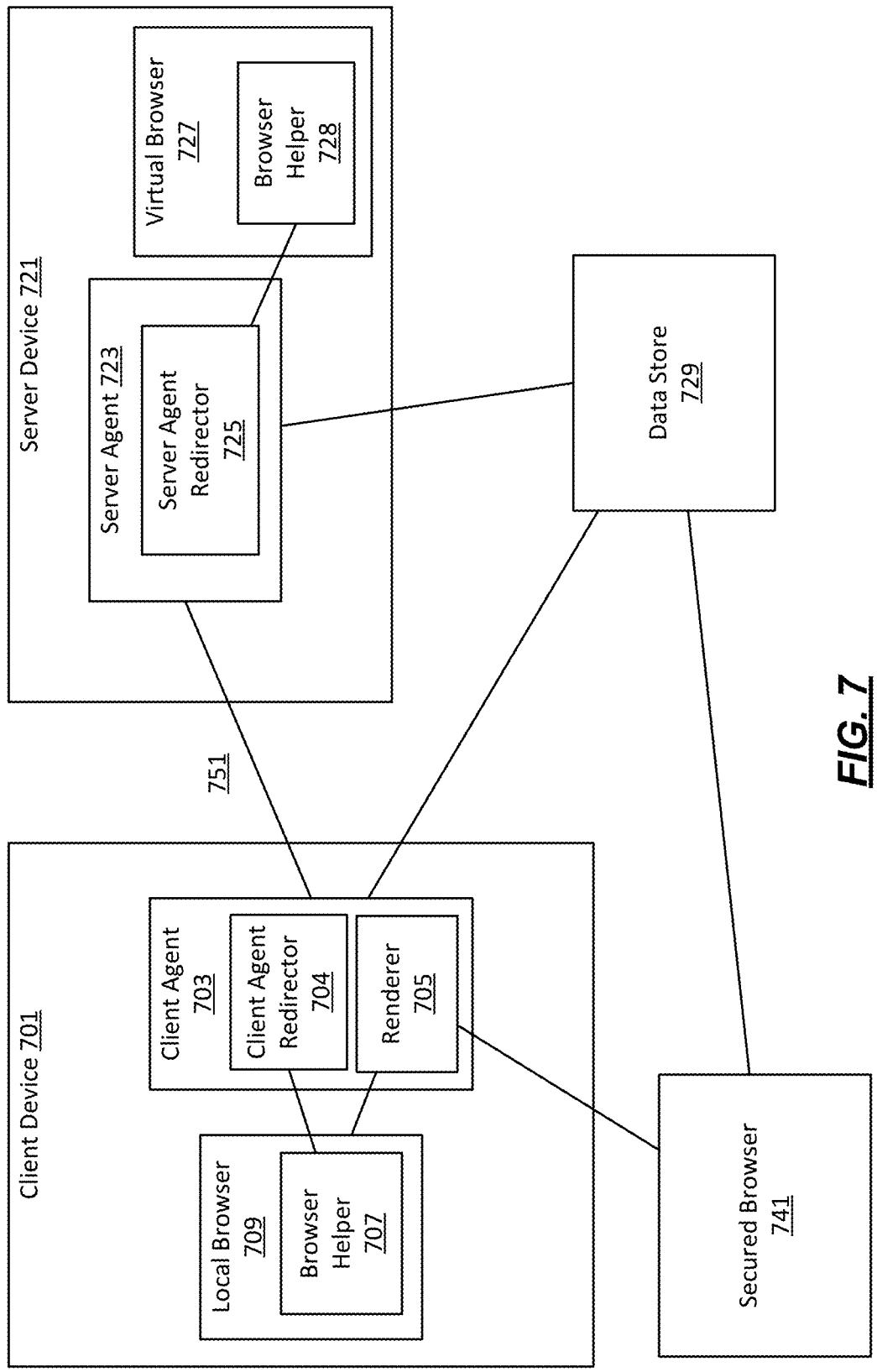
FIG. 7 illustrates an example system for unifying display of virtual resources in accordance with one or more illustrative aspects described herein.

FIG. 7 illustrates an example system for unifying display of virtual resources in accordance with one or more illustrative aspects described herein. The system may comprise a server device 721, and the server device 721 may comprise a server agent 723. The server agent 723 may facilitate delivery of resources, such as enterprise resources, to one or more client devices.

The server device 721 may comprise a virtual browser 727. The virtual browser 727 may receive a request to launch a URL within a virtual session of the server device 721. The virtual browser 727 may include a browser helper 728 (e.g., a browser helper object, such as a browser add-on), which may intercept actions within the virtual browser 727 browser, such as launch of a new URL. The browser helper 728 may send one or more of the actions to a server agent redirector 725, such as if the URL is a non-whitelist URL. The server agent redirector 725 may receive the action(s) from the browser helper 728, and may be used to redirect the URL request to the client device 701. The server agent redirector 725 may be part of the server agent 723. For example, the server agent redirector 725 may comprise a process within the server agent 723. Alternatively, the server agent redirector 725 may be a process separate from the server agent 723. The redirector 725 may facilitate redirection of URL requests to client devices.

The system may comprise a data store 729. The data store 729 may store data indicating actions originated within the virtual browser 727 and/or due to actions and/or data received from the client device 701, such as via a virtual channel 751. As will be described in further detail below, the data store 729 may store information for launched URLs along with state information for launching the URL and/or displaying content from the URL.

The system may comprise a client device 701. A virtual channel 751 may be established between the server device 721 and the client device 701. In some examples, the virtual channel may connect the server agent 723 to a client agent 703 of the client device 701. The virtual channel 751 may use, for example, an HDX/ICA display remoting protocol, as previously explained.

The client device 701 may comprise a local browser 709. The local browser may execute locally on the client device 701. The local browser 709 may include a browser helper 707. The browser helper 707 may be, for example, a browser helper add-on, such as a plugin of the local browser 709 and/or may be hosted in the same memory or address space as the local browser 709. As will be described in further detail below, the browser helper 707 may capture redirected request(s), and the browser helper 707 may send (e.g., forward) the captured request to a client agent redirector 704. The client agent redirector 704 may communicate the captured redirect request to the client agent 703 of the client device 701. The client agent redirector 704 may comprise a process within the client agent 703. Alternatively, the client agent redirector 704 may be a process separate from the client agent 703. The client agent 703 may receive the request from the browser helper 707 and may determine whether to launch the URL on a local browser of the client device 701 (e.g., a local browser 709) or to launch the URL via another browser, such as a secured browser 741.

The secured browser 741 may run in a different session from the local browser 709 and from the virtual browser 727. For example, the secured browser 741 may comprise a cloud-hosted web browser and may run on a secured browser cloud service. The secured browser 741 may be used to isolate certain types of web browsing, such as browsing of unsafe or untrusted URLs. Only certain types of activities, such as screen updates, mouse click, keystroke commands, etc., might reach the client device 701, and the client device 701 may be protected from unsafe or untrusted content. A web browser instance of the secured browser 741 may be displayed, on the client device 701, side-by-side with the virtual browser 727 running on the server device 721 and/or next to the local browser 709 running on the client device 701.

The client agent 703 may comprise a renderer 705. The renderer 705 may receive one or more images or information used to generate (e.g., render) images, such as bitmaps, from the server agent 723 (e.g., via the virtual channel 751), the secured browser 741, and/or the local browser 709. The renderer 705 may control which browser window(s) and/or tab(s) are to be displayed and how they are to be displayed. As will be explained in further detail below, the renderer 705 may combine views from different browsers, such as the virtual browser 727, the secured browser 741, the local browser 709, or other browsers. Details of various steps performed by the components shown in FIG. 7 will be described in further detail below.

Figure 9:
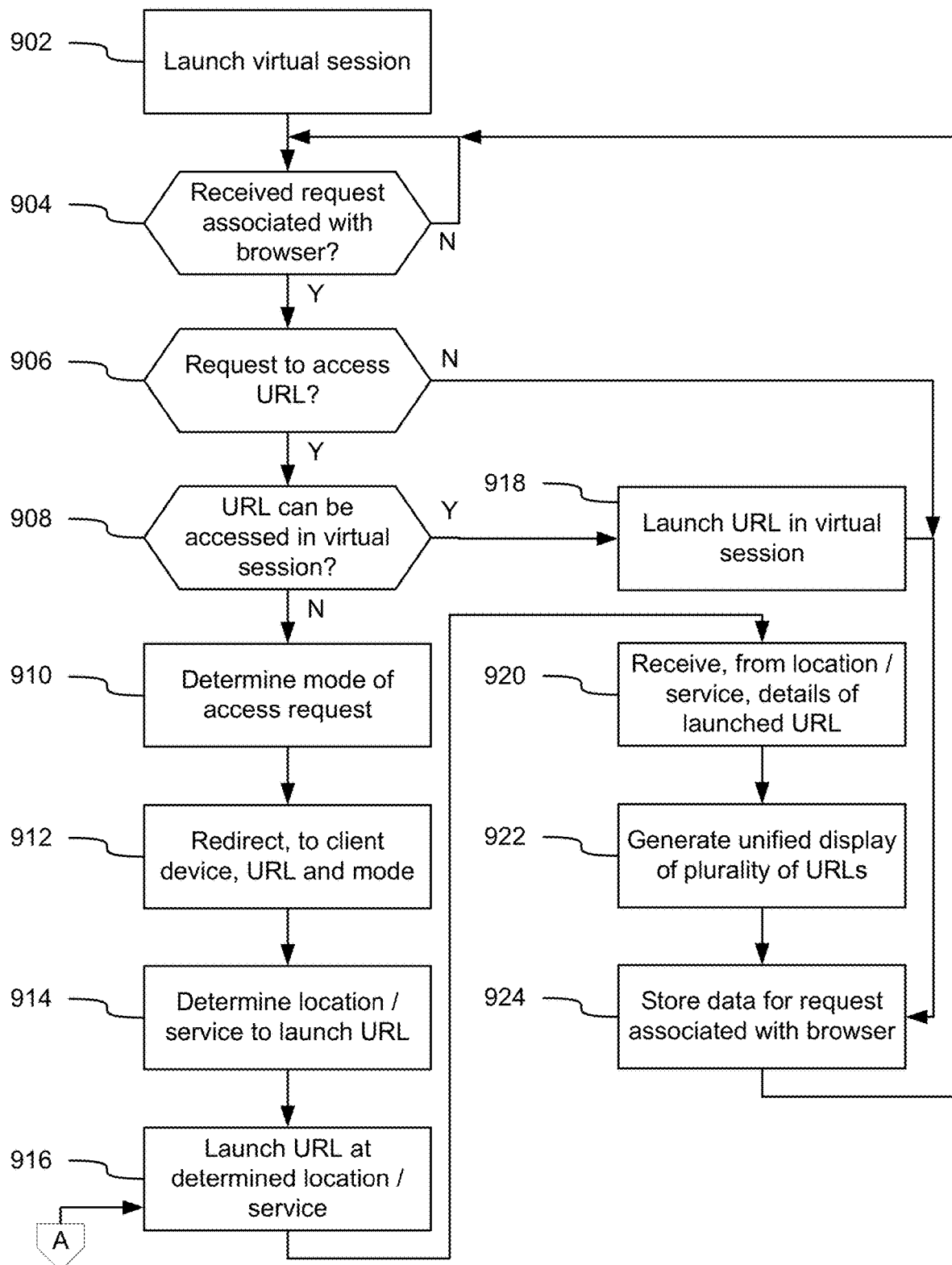
FIG. 9 illustrates an example method for unifying display of virtual resources in accordance with one or more illustrative aspects described herein.

FIG. 9 illustrates an example method for unifying display of virtual resources in accordance with one or more illustrative aspects described herein. In step 902, a server device, such as the server device 721, and/or a client device, such as the client device 701, may work to launch a virtual session. The virtual session may include a virtual desktop or a virtual application on a virtual machine. The virtual machine may run on the server device 721 or on another server device. Additionally or alternatively, the virtual session may be a virtual session using a secured browser, such as the secured browser 741. The virtual session may comprise a virtual web session. For example, a virtual browser application, such as the virtual browser 727, may be hosted and/or executed on a virtual desktop. Additionally or alternatively, the virtual browser 727 may comprise a published and/or dedicated virtual browser application. After the virtual desktop session, virtual application session, and/or virtual secured browser session is launched, a user may interact with the virtual session via the client device 701. For example, the user may open new tabs or windows within a browser application, adjust existing tabs or windows, and the like.

Figure 8:
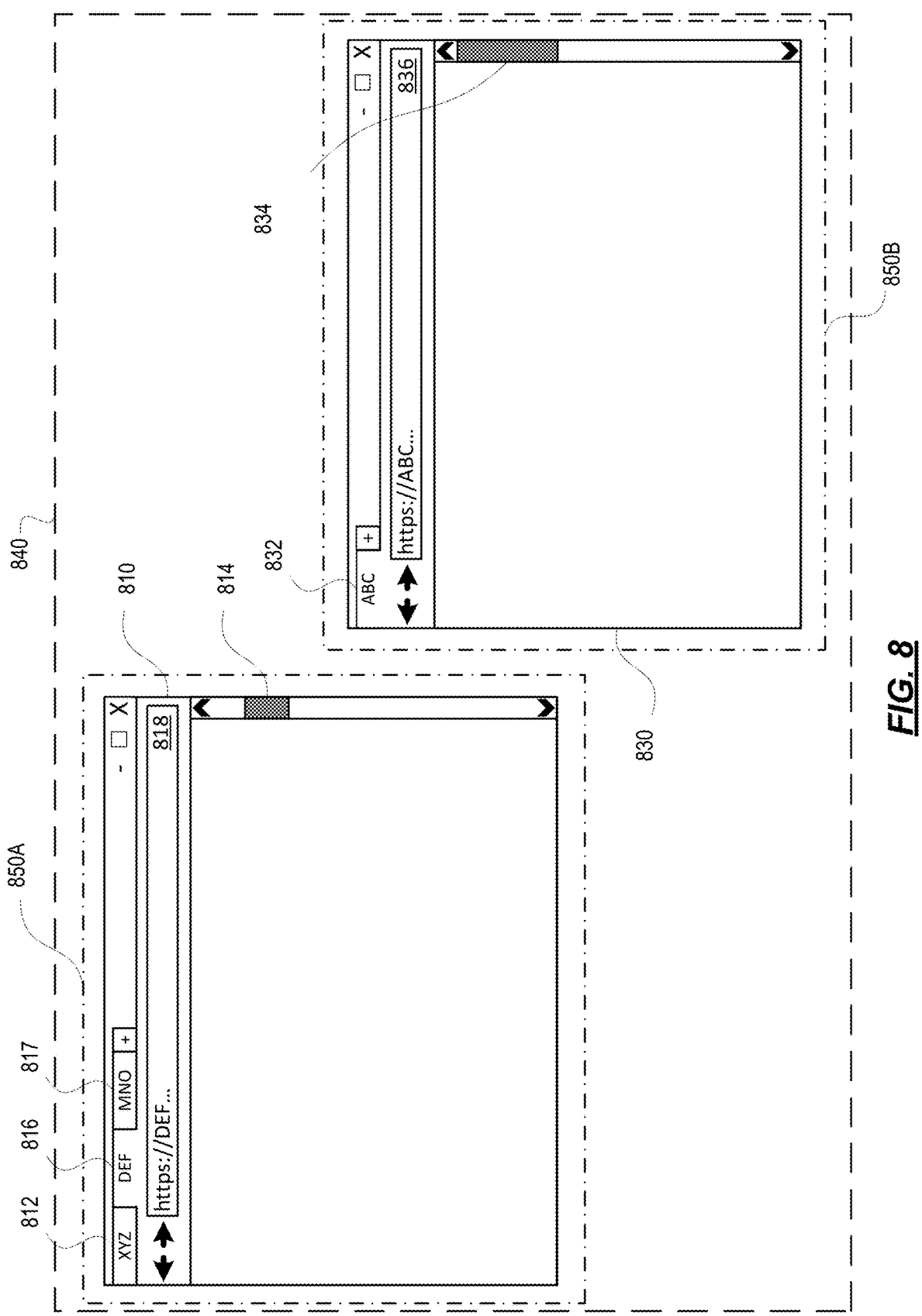
FIG. 8 illustrates an example of a unified display of virtual resources in accordance with one or more illustrative aspects described herein.

In step 904, the server device 721 may determine whether it has received a request associated with a browser, such as the virtual browser 727 or the secured browser 741. For example, the client device 701 may send, to the server device 721 and/or via the virtual channel, a request associated with the browser, and the server device 721 may receive the request. If the server device has received a request associated with the browser (step 904: Y), the method may proceed to step 906. The browser helper 728 on the server device 721 may also intercept requests associated with the virtual browser 727 and access for URLs. If, on the other hand, the server device has not received a request associated with the browser (step 904: N), the server device may return to step 904 and wait to receive a request. The request may comprise a request, from a user and via the client device, to modify existing tabs and/or windows, such as moving windows within a display area, moving tabs (e.g., changing the order of tabs within a window), moving slider bars for tabs or windows, or other user interactions associated with a virtual browser. FIG. 8 illustrates an example of a unified display of virtual resources in accordance with one or more illustrative aspects described herein. The user may move the browser window 810, adjust the size of the browser window 810, change the order of the tabs 812, 816, and/or 817 within the browser window 810, move the slider bar 814 up or down, or otherwise attempt to change the characteristics of the browser window 810 (or other browser windows, such as browser window 830). In some examples, the URLs corresponding to the tabs 812, 816, and 817 may be launched in different locations. For example, the URL in the tab 812 may be launched at the virtual browser 727 (e.g., in a base virtual session), the tab 816 may be launched at the secured browser 741, and the tab 817 may be launched at the local browser 709.

The request associated with the browser may comprise a request, from the user and via the client device, to open a new tab or open a new window in the virtual session. For example, the user may enter a new URL into the address or search bar 836. The user may also perform a search engine search (e.g., by entering keywords into the address or search bar 836) and select one of the search results, which may cause a corresponding URL to be launched. Additionally or alternatively, the user may open a new window or open a new tab within an existing window and enter a new URL or access a new URL using a search engine search. The user might click on a link within an already opened browser page, or the user may click on a URL link within another virtual application within the same virtual session. Returning to FIG. 9, after a request associated with the browser has been received, the method may proceed to step 906.

In step 906, the server device 721 may determine whether the request associated with the browser comprises a request to access (e.g., open) a URL. If the request comprises a request to access a URL (step 906: Y), the method may proceed to step 908. As previously explained, the request to access a URL may comprise a request to access a new URL in a new tab or window or in an existing tab or window. If the request does not comprise a request to access a URL (step 906: N), the method may proceed to step 924, as will be described in further detail below. For example, the request may comprise an action on an existing tab and/or window, such as a request to move a window, move a tab, move slider bars for windows and/or tabs, etc.

In step 908, the server device 721 may determine whether the URL can be accessed (e.g., opened) in the virtual session. Configuration policies may be used to determine whether the URL can be accessed. For example, configuration policies may comprise a list (e.g., a whitelist) of URLs that may be launched in the virtual session. Non-whitelist URLs might not be able to be launched in the virtual session. Additionally or alternatively, configuration policies may comprise a blacklist of URLs that are not permitted to be launched in the virtual session, and URLs not on the blacklist may be permitted to be launched in the virtual session. If the URL can be accessed in the virtual session (step 908: Y), the method may proceed to step 918. In step 918, the server device 721 may launch the URL in the virtual session. For example, and with reference to FIG. 7, the server device 721 may launch the URL in the virtual browser 727 if the base virtual session is a virtual desktop or virtual application executing on the server device 721. If the base virtual session is running as a secured browser 741, the URL may be launched in the secured browser 741. Returning to FIG. 9, if, on the other hand, the URL cannot be accessed in the virtual session (step 908: N), the method may proceed to step 910.

In step 910, the server device 721 may determine the mode of the access request. The mode may comprise, for example, accessing the URL in an existing or new browser tab or accessing the URL in an existing or new browser window. In step 912, the server device 721 may redirect, to the client device, the URL of the access request and the mode of the access request (e.g., accessing the URL in a tab or accessing the URL in a window). With reference to FIG. 7, the server agent redirector 725 may communicate, with the server agent 723 of the server device 721, an indication to redirect, to the client device 701, the URL and the mode of access (e.g., opening in a tab or a window). The server agent 723 may send the information to the client agent 703 and via the virtual channel 751. As previously explained, the browser helper 728 may capture user actions such as clicking a link, entering a URL in the address bar, selecting a bookmark link, etc. showing intent to launch a new URL. The browser helper 728 may send this information to the server agent redirector 725 (e.g., within the server agent 723), and the server agent redirector 725 may determine whether to launch the URL in the virtual browser 727 or at a different location. Whether to launch the URL in the virtual browser 727 may be based on, for example, whitelist policies. The mode of access for a non-permitted URL (e.g., non-whitelisted URL) to be opened may also be determined. The server agent redirector 725 may send, using the server agent 723, to the client agent 703, and via the virtual channel 751, the URL to be opened and the mode to open the URL.

Returning to FIG. 9, in step 914, the client device 701, such as via the client agent 703, may determine a location to launch the URL and/or a service with which to launch the URL. For example, assume that the base virtual session (e.g., launched in step 902) comprises a virtual desktop or virtual application executing on the server device 721. The client device 701 may determine to launch the URL at a different location if the URL is not permitted to be launched by the virtual desktop or application. For example, the client device 701 may determine to launch the URL locally at the client device 701, such as via the local browser 709. The client agent 703 may have access to local applications on the client device, such as the local browser 709, and may determine to launch non-whitelisted URLs on the local browser 709. Alternatively, the client device 701 may determine to launch the URL using the secured browser 741, or to launch the URL at another location. Configuration policies may indicate whether to launch the URL locally, using the secured browser 741, or at another location and/or service.

URLs may also be launched at locations having graphics capabilities satisfying the URL's graphics requirements. Some URLs may be more graphics intensive, and other URLs may be less graphics intensive. For example, URLs with graphics intensive content, such as high definition videos, flash-based applications, etc., may have higher graphics requirements, whereas URLs with content that is less graphics intensive, such as text, may have lower graphics requirements. Graphics requirements for URLs may be specified, for example, by an administrator when publishing the resource. In some examples, as URLs are launched and the content is fetched, the browser helper 707 or the browser helper 728 may be aware of the graphics requirements. For example, an HTML Iframe may require flash redirection video, and the browser helper may be aware of this requirement. The browser helper 707 or the browser helper 728 may send an indication of the graphics requirements to its corresponding redirector 704 or 725. Alternatively, an agent may monitor the browser processes and may store the peak memory or other attributes used by the process. For example, the agent may note that 1.2 GB was needed to launch the browser application, but that the client has less than 1.2 GB of RAM available. In some example, the redirector 725 may request the server agent 723 to store, in the data store 729, metadata associated with the URL and that indicates the graphics requirements.

Different locations may have different graphics capabilities. For example, a personal computer may have a graphics processing unit (GPU), such as part of a dedicated graphics card, capable of handling URLs with graphics intensive content. Other locations, such as the server device 721 or other host server, may have access to virtual GPUs (vGPUs) and/or real GPUs that allow graphics to be rendered on the server rather than the client device. Other remote locations might or might not have access to vGPUs. The URL may be launched at a location having graphics capabilities that satisfy the URL's graphics requirements.

In step 916, the client device 701 may launch the URL at the determined location and/or with the determined service. As explained above, the client agent 703 may access the local browser 709 and send a request to the local browser 709 to launch the URL. Alternatively, the client agent 703 may send a request to the secured browser 741 for the secured browser 741 to launch the URL via a virtual web session. If the URL is launched on the local browser 709 or the secured browser 741, and one or more other URLs are launched on a virtual desktop or virtual application executing on the server device 721, two or more browser windows might be displayed from two or more different sources in some examples. The displays of the browser windows may be unified, as will be described in further detail below.

In step 920, the client device 701 may receive, from the location and/or service that launched the URL, details of the launched URL. Details of the launched URL may comprise images and/or information used to generate images corresponding to the launched URL, such as bitmaps for the launched URL. As will be described in further detail below, the images may be used by the client device to generate an image of the content of the URL, such as webpage content. With reference to FIG. 7, the renderer 705 of the client device 701 may receive details of the launched URL from the secured browser 741 if the URL was launched at the secured browser 741. The renderer 705 may receive details of the launched URL from the local browser 709 if the URL was launched at the local browser 709. The renderer 705 may receive details of the launched URL from the server agent 723 (e.g., via the virtual channel 751) if the URL was launched at the virtual browser 727.

Returning to FIG. 9, in step 922, the client device 701 (e.g., using the renderer 705) may generate a unified display of a plurality of URLs, including the launched URL (e.g., launched in step 916). For example, display of the launched URL may be combined (e.g., unified) with the display of URL(s) launched at other locations and/or with other services. With reference to FIG. 8, assume that the URL corresponding to the tab 812 and the URL corresponding to the tab 832 were previously launched on the virtual browser 727 and that the tab 812 (and it corresponding window 810) and the tab 832 (and its corresponding window 830) are displayed by the client device. Also assume that the user attempts to open the URL "https://DEF . . . " in a new tab 816 of the window 810. If the URL "https://DEF . . . " is a non-white list URL, the server agent redirector 725 may redirect the URL "https://DEF . . . " to the client device 701. The URL "https://DEF . . . " may be launched at the secured browser 741 or the local browser 709. If the URL "https://DEF . . . " is launched at the secured browser 741, the client device may receive, from the secured browser 741, details of the launched URL "https://DEF . . . ."

Without unifying display of the browser windows and/or tabs, content for the webpage corresponding to the URL "https://DEF . . . " may be displayed separately from the window 810, such as in a dedicated secured browser 741 window (not shown). If, however, the renderer 705 of the client device 701 unifies display of the webpage content from the URL "https://DEF . . . " with existing windows and/or tabs, the webpage content from the URL "https://DEF . . . " may be displayed as a new tab 816 within the window 810. For example, the user may have requested to display tabs 812, 816, and 817 in the same window 810. By unifying the display of URLs launched at different locations, content may be displayed more efficiently on a display of the client device. For example, instead of displaying three separate browser windows, the client device 701 may display two browser windows 810 and 830, with the browser window 810 having three tabs 812, 816, and 817. Alternatively, the client device 701 may display one browser window having four tabs 812, 816, 817, and 832.

As described above, the client device 701 may generate a unified display of URLs launched in different locations. With reference to FIG. 7, the renderer 705 of the client device 701 may receive information for generating images of content from URLs launched at different locations, such as information from the virtual browser 727, information from the secured browser 741, and/or information from the local browser 709. The renderer 705 may unify display of the URLs, such as by combining windows and/or tabs. For example and with brief reference to FIG. 8, the renderer 705 may cause display of content corresponding to a URL launched at the virtual browser 727 in the tab 812, cause display of content corresponding to a URL launched at the secured browser 741 in the tab 816, cause display of content corresponding to a URL launched at the local browser 709 in the tab 817, and cause display of content corresponding to a URL launched at the local browser 709 in the tab 832.

Where to display each URL may be configured by the user of the client device 701 or an administrator. For example, assume that the client device 701 has and/or is connected to two monitors. Configuration parameters may indicate that whitelisted URLs are to be displayed on one monitor, and non-whitelisted URLs are to be displayed on the other monitor. The renderer 705 may read the configuration parameters and, based on the configuration parameters, unify display of the URLs by causing display of the whitelisted URLs on one monitor and causing display of the non-whitelisted URLS on the other monitor. Additionally or alternatively, configuration parameters may indicate that whitelisted URLs are to be displayed on one window, and non-whitelisted URLs are to be displayed on a different window. The renderer 705 may read the configuration parameters and, based on the configuration parameters, unify display of the URLs by causing display of the whitelisted URLs on one window and causing display of the non-whitelisted URLS on the second window. As the user moves the browser windows across monitors, location attributes of the monitor and position may be captured by the client device 701 and sent to the server device 721 to be stored in the data store 729. As will be described in further detail below, this information may be read during reconnection to give the user the same or similar experience the user had before disconnecting.

Returning to FIG. 9, in step 924, data for the request associated with the browser may be stored. The data may be stored at the server device 721 or another server device. For example, the data may be stored in a data store 729, such as in a user profile associated with the base virtual session, a database, etc. The client device 701 may send the data to the server device 721, and the server device 721 in turn may store the data in the data store 729. Data in the data store 729 may be accessible to the server agent 723 and/or the client agent 703. For example, the server device 721 may send, to the client device 701 or another client device, data from the data store 729 after reconnection or session launch, as will be described in further detail below. The stored data may be updated and may be used to determine where to launch the URL and/or to re-generate display of windows and/or tabs corresponding to the URL. For example, the user may disconnect and reconnect to the virtual session or roam to the virtual session on a different client device, and may desire to display the same windows and/or tabs from the previous virtual session (e.g., in the same or similar configuration).

As previously explained, the request may have been a request to access a new URL in a tab of an existing window or in a new window. The client device 701 and/or the server device 721 may store the URL along with state information for launching the URL and/or displaying content from the URL. State information may include, for example, the tab and/or window used to display content from the URL. With reference to FIG. 8, state information may indicate that content from the URL "https://DEF . . . " is displayed in tab 816 of the window 810. State information may indicate the location of the tab or window within a display area of the client device. For example, the client device may have a single display area 840 (e.g., for a single monitor). The state information may indicate the location of the window 810 in the display area 840 (e.g., locations of the corners of the window 810, the location of the center of the window 810, the size of the window 810, etc.). The state information may also indicate the order of the tabs 812, 816, and 817 within the window 810. The state information may also indicate which tab is currently being displayed to the user (e.g., tab 816). State information for the window 830 may similarly be stored.

In some examples, the client device 701 may have multiple display areas 850A and 850B (e.g., in a dual monitor scenario). The state information may indicate which monitor was used to display which tab and/or window. For example, the state information may indicate that the window 810 and its corresponding tabs 812, 816, and 817 are displayed on the display area 850A of a first monitor and that the window 830 and its corresponding tab 832 are displayed on the display area 850B of a second monitor. The state information may indicate the locations (e.g., coordinates) of horizontal sliding bars or vertical sliding bars for each tab or window. For example, the state information may indicate the coordinates of the vertical sliding bar 834 of the tab 832. The state information may indicate coordinates of other sliding bars, such as the vertical sliding bar 814 of the tab 816.

As explained above, some URLs may be more graphics intensive, and other URLs may be less graphics intensive. URLs with graphics intensive content, such as high definition videos, may have higher graphics requirements, whereas URLs with content that is less graphics intensive, such as text, may have lower graphics requirements. The state information stored in the data store 729 may indicate graphics (e.g., graphics processing unit (GPU)) requirements for each URL.

Content from some URLs may display better in certain browser types than in other browser types. Examples of different types of browsers include CHROME, INTERNET EXPLORER, FIREFOX, etc. Code for a particular URL may be developed or optimized for a subset of browser types but not developed or optimized for another subset of browser types. For example, a URL may work well in CHROME, but might not work well in INTERNET EXPLORER. State information stored at the data store 729 may indicate whether a particular URL is developed or optimized for certain browser types and may indicate those browser types.

The state information may indicate the location and/or service with which the URL was launched. For example, the state information may indicate that the URL "https://XYZ . . . " was launched at the virtual browser 727, that the URL "https://DEF . . . " was launched at the secured browser 741, and/or that the URL "https://ABC . . . " was launched at the local browser 709.

With reference to step 906 shown in FIG. 9, the request associated with the browser might not be a request to access a URL (step 906: N). For example, the request may comprise a request to modify an existing tab and/or window, such as a request to move a window, move a tab, move slider bars for windows and/or tabs, etc. The method may proceed to step 924. In step 924, data associated with the virtual session may be updated to reflect the modification to the existing tab and/or window. With reference to FIG. 8, if the user moves the browser window 810, the session data may be updated to reflect the new location of the window 810. If the user adjusts the size of the browser window 830, the session data may be updated to reflect the new size of the window 830 and/or the new location of the window 830 due to resizing. If the user changes the order of the tabs 812, 816, and/or 817 within the browser window 810 (e.g., to place tab 816 before tab 812, to place tab 816 after tab 817, to place tab 812 after tab 817, etc.), the session data may be updated to reflect the new order of the tabs. If the user moves the vertical slider bar 814 up or down, the session data may be updated to reflect the new location of the vertical slider bar 814. Other changes to the browser window 810 or browser window 830, and their components may be reflected in the session data. By storing URLs and/or their state information, the client device 701 and/or server device 721 may be able to determine where to launch URLs and/or to re-generate displays of windows and/or tabs corresponding to the URLs, such as if the user reconnects to the virtual session from the same client device 701 or a different client device.

Figure 10:
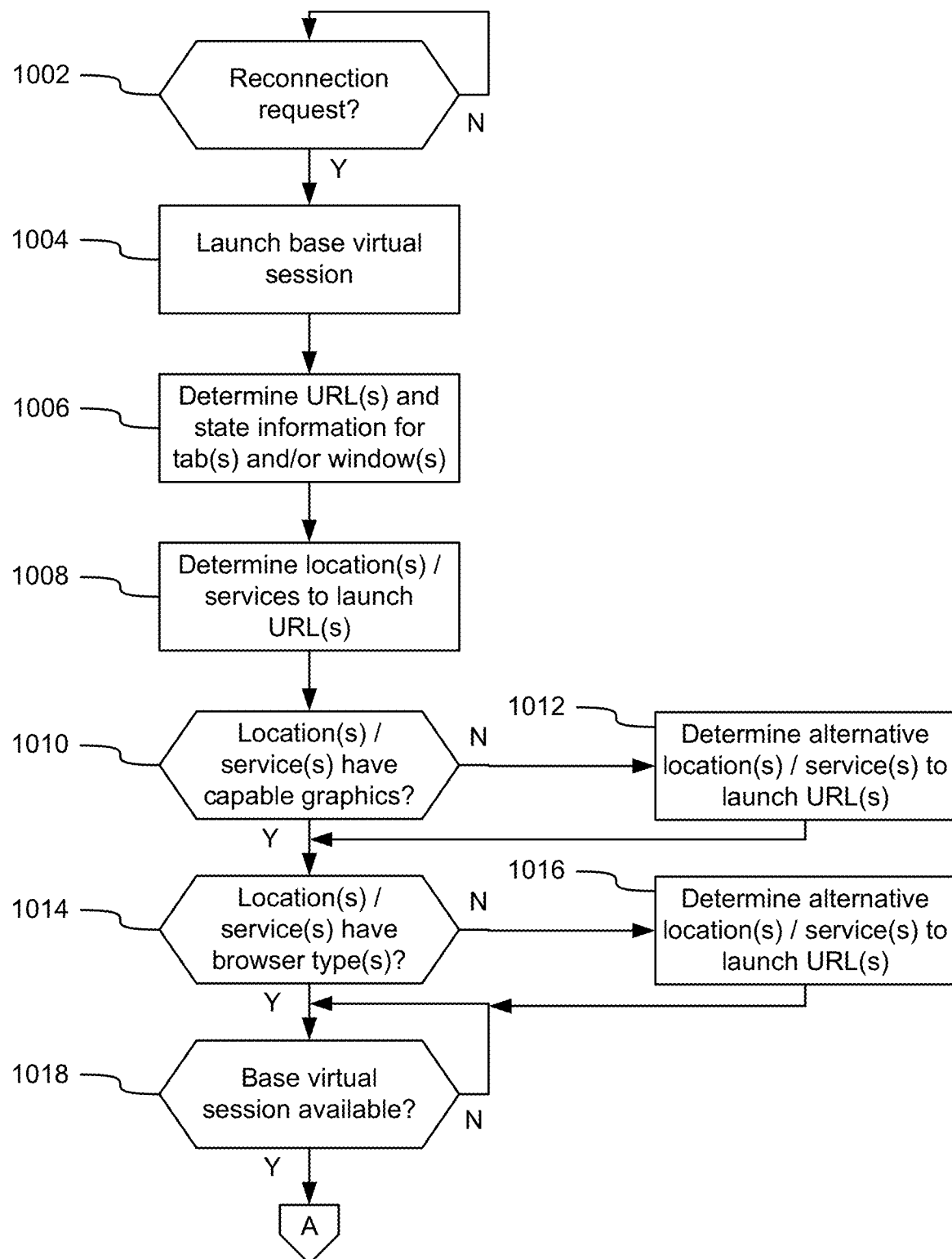
FIG. 10 illustrates another example method for unifying display of virtual resources in accordance with one or more illustrative aspects described herein.

FIG. 10 illustrates another example method for unifying display of virtual resources in accordance with one or more illustrative aspects described herein. A user may disconnect from a virtual session and may desire to reconnect to the virtual session in the future using the same client device or a different client device. After reconnection, tabs and/or windows displayed during the previous virtual session may be displayed in the current session.

In step 1002, a server device (e.g., the server device 721) may determine whether the server device has received a reconnection request and/or a session roaming login request. A user may have previously disconnected from a virtual session, and the user may attempt to reconnect to the virtual session from the same client device 701. Alternatively, the user may desire to reconnect to the virtual session from a different client device. For example, session roaming may be enabled for the virtual session, and a user may attempt to reconnect to the virtual session from a different client device using session roaming features. After a user attempts, via the client device 701 or a different client device, to reconnect to the virtual session, the server device 721 may receive the reconnection request. If the server device has not received a reconnection request for the session (step 1002: N), the server device may return to step 1002 and wait to receive a reconnection request from the user. If the server device has received a reconnection request (step 1002: Y), the method may proceed to step 1004.

In step 1004, the base virtual session may be launched by the client device and/or the server device. As previously explained, the base virtual session may comprise, for example, a virtual application and/or a virtual desktop. The base virtual session may be the initial virtual session that may allow the client device and/or server device to launch additional virtual sessions, such as if URLs are to be launched from different locations and/or servers. During launch of the base virtual session, the client agent 703 may communicate with the server agent 723, such as via a virtual connection, to establish the virtual session on the server device 721. While the base virtual session is being launched, the client device and/or server device may prepare to launch URLs associated with the base virtual session by determining, for example, which tabs and/or windows are to be launched, the locations to launch the tabs and/or windows, and/or settings for the tabs and/or windows to be launched (e.g., location of windows, order of tabs, locations of sliding bars, etc.). For example, initiating launch of the base virtual session may trigger preparations to launch URL(s). By preparing to launch the URLs while the base virtual session is being launched, the system may more efficiently and quickly launch the URLs and the appropriate settings after the base virtual session becomes available. The lag time between when the user requests reconnection to displaying browser tabs and/or windows on the client device may be reduced.

In step 1006, the client device 701 (or a different client device) may determine URL(s) to be launched. The URL(s) to be launched may be associated with the base virtual session. The client device may access the data store 729 (e.g., via a user profile associated with the base virtual session) for information associated with the base virtual session, such as which URL(s) were active during the previous virtual session. The client device may request, from the data store 729 and through the server device 721, the information or may directly access the information from the data store 729. The client device 701 may request state information for launching and/or displaying each URL. Examples of state information were previously described, and may include which tab(s) and/or window(s) were used to display the URL(s). State information may indicate the location of the window(s) in the display area of the client device, the order of tab(s) within windows, which tab was displayed, which monitor was used to display each window (e.g., for multi-monitor scenarios), locations of horizontal sliding bars or vertical sliding bars for each tab or window, etc.

In step 1008, the client device may determine location(s) to launch the URL(s) and/or service(s) for launching the URL(s). The data stored for the base virtual session may indicate the location that each URL was launched in the previous session and/or the service that was used to launch each URL, such as the local browser 709, the virtual browser 727, the secured browser 741, or a different browser. The client device may receive this information from the data store 729, and the information may be used to determine where to launch the URL(s) in the current session. With reference to FIG. 8, assume, for example, that the information indicates that the URL "https://XYZ . . . " was launched at the virtual browser 727, the URL "https://DEF . . . " was launched at the secured browser 741, and the URL "https://ABC . . . " was launched at the local browser 709 of the client device 701. The client device may initially determine to launch the URL(s) at the same locations and/or using the same service(s). The location to launch the URL may change depending on various capabilities of the location, such as graphics capabilities of the location or browser types supported by the location.

Returning to FIG. 10, in step 1010, the client device may determine whether the determined location(s) and/or service(s) have appropriate graphics capabilities that satisfy graphics requirements for URLs. The client device may receive, from the data store 729, information indicating the graphics requirements for a URL. The client device may compare the graphics capabilities of the location to launch the URL to the graphics requirements for the URL. As previously explained, some URLs may have higher graphics requirements (e.g., higher processor speed, more memory, dedicated GPU, etc.), and other URLs may have lower graphics requirements (e.g., lower processor speed, less memory, graphics integrated with general processor, etc.). Graphics requirements for one or more of the URLs associated with the virtual session may be stored in the data store 729. If the determined location(s) and/or service(s) have appropriate graphics capabilities (step 1010: Y), the method may proceed to step 1014, as will be described in further detail below. If the location at which a URL was previously launched no longer has appropriate graphics capabilities to satisfy graphics requirements for the URL (step 1010: N), the method may proceed to step 1012.

In step 1012, the client device may determine alternative location(s) and/or service(s) to launch tabs and/or windows. The alternative location(s) and/or service(s) may have access to graphics capabilities that satisfy the graphics requirements for the URL. A graphics intensive URL may have been launched by the local browser 709 of the client device 701 in a previous session because, for example, the client device 701 has powerful graphics capabilities. If the user attempts to reconnect to the session from a different client device with less powerful graphics capabilities (e.g., a mobile phone), the client device may attempt to find a different location to launch the URL, such as a remote location having access to a vGPU. For example, the virtual browser 727 and/or server device 721 may have access to a vGPU, and the client device may determine to launch the URL using the virtual browser 727 instead of at the client device.

As another example, assume that the previous session was initiated at a mobile device with weaker graphics capabilities. During the previous session, a graphics intensive URL may have been launched by the secured browser 741 having access to a vGPU that satisfies the graphics requirements of the URL. The user may reconnect to the session via a client device having more powerful graphics capabilities that satisfy the graphics requirement of the URL, such as a personal computer, a laptop computer with a dedicated GPU, etc. The client device may determine to launch the URL using a local browser of the client device instead of the secured browser 741. In some examples, preference may be given to local GPUs over vGPUs. In other examples, users may decide whether to give preference to local GPUs or vGPUs. The method may proceed to step 1014.

In step 1014, the client device may determine whether the determined location(s) and/or service(s) have appropriate browser type(s) for launching the URLs. The client device may receive, from the data store 729, information indicating which URLs to be launched have been developed or optimized for certain browser types. The client device may determine whether the determined location for the URL has a browser of the browser type. If the determined location(s) and/or service(s) have appropriate browser type(s) (step 1014: Y), the method may proceed to step 1018, as will be described in further detail below. If the determined location(s) and/or service(s) do not have the appropriate browser type(s) (step 1014: N), the method may proceed to step 1016. For example, a URL may have been launched in the previous session with a local browser 709 on the client device 701. The URL may be developed or optimized for a browser of a first browser type (e.g., CHROME), and the local browser 709 of the client device 701 may be of the first browser type. The user may attempt to reconnect to the session from a different client device that has a local browser of a second browser type (e.g., INTERNET EXPLORER), but does not have a browser of the first browser type. The client device may attempt to determine another location to launch the URL optimized for the first browser type.

In step 1016, the client device may determine alternative location(s) and/or service(s) to launch tabs and/or windows having browser requirements. In the above example, the client device may determine to launch the URL at a location supporting the first browser type (e.g., CHROME). For example, the virtual browser 727 may support the first browser type, and the client device may determine to launch the URL at the virtual browser 727. Alternatively, the secured browser 741 may support the first browser type, and the client device may determine to launch the URL at the secured browser 741. The method may proceed to step 1018.

In step 1018, the client device may determine whether the base virtual session is available. The base virtual session may be available once launch is complete and/or after browser windows and/or tabs can be displayed on the client device. Views of the windows and/or tabs may be hidden until after the base virtual session is available. If the base virtual session is not yet available (step 1018: N), the client device may wait until the base virtual session becomes available. If the base virtual session is available (step 1018: Y), the client device may proceed to launch the URL(s) at the determined locations or services and/or generate unified displays of the plurality of URLs on the client device. For example, the method may return to step 916 shown in FIG. 9, and the URLs may be launched. As previously explained, in step 920, details of the URLs launched in the reconnect session may be received. In step 922, the client device may generate a unified display of the URLs. In step 924, data associated with the launched URLs and/or windows or tabs used to display the URLs may be stored. One or more of the steps illustrated in FIG. 9 may be performed as previously described until, for example, the session is disconnected.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
in a first virtual session between a client device and a server device, sending, by the client device to the server device, a first request to access first web content via a first browser running on the server device;
receiving, by the client device from the server device, a second request to access the first web content; and
rendering the first web content on a first browser tab of a second browser running on the client device; and
rendering second web content, associated with a third browser running in a second virtual session different from the first virtual session, on a second browser tab of the second browser.

2. The method of claim 1, wherein the first browser comprises a virtual browser running on the server device,
wherein the second browser comprises a local browser running on the client device, and
wherein the third browser comprises a secured browser that is hosted on a cloud network.

3. The method of claim 1, wherein the rendering the second web content comprises:
receiving, by the client device via the second virtual session, a screen update of the third browser; and
rendering the second web content based on the screen update.

4. The method of claim 1, wherein the receiving the second request is based on a determination that the first web content is not permitted to be accessed via the first browser.

5. The method of claim 1, further comprising:
sending, by the client device to the server device, a third request to modify one or more characteristics of a display area of the first browser; and
based on the third request, causing storage, in a data store associated with the first virtual session, of an indication of modification to the one or more characteristics of the display area of the first browser.

6. The method of claim 1, further comprising determining, based on graphics requirements associated with the first web content, the second browser.

7. The method of claim 1, wherein the first request comprises a uniform resource locator (URL) for the first web content.

8. The method of claim 1, wherein a browser helper running on the server device is configured to detect a user action associated with the first request to determine a mode of access for the first web content on the first browser running on the server device,
wherein the second request comprises an indication of the mode of access, and
wherein the rendering the first web content comprises rendering the first web content according to the mode of access.

9. The method of claim 8, wherein the mode of access indicates access via one of an existing browser tab, a new browser tab, an existing browser window, or a new browser window.

10. A client device comprising:
one or more processors; and
memory storing instructions that, when executed by the one or more processors, cause the client device to:
in a first virtual session between the client device and a first server device, send, to the first server device, a first request to access first web content via a first browser running on the first server device;
receive, from the first server device, a second request to access the first web content;
render the first web content on a first browser tab of a second browser running on the client device; and
render second web content, associated with a third browser running in a second virtual session between the client device and a second server device, on a second browser tab of the second browser.

11. The client device of claim 10, wherein the first browser comprises a virtual browser running on the first server device,
wherein the second browser comprises a local browser running on the client device, and
wherein the third browser comprises a secured browser that is hosted on a cloud network.

12. The client device of claim 10, wherein the instructions, when executed by the one or more processors, cause the client device to render the second web content by:
receiving, via the second virtual session, a screen update of the third browser; and
rendering the second web content based on the screen update.

13. The client device of claim 10, wherein the instructions, when executed by the one or more processors, cause the client device to receive the second request based on a determination that the first web content is not permitted to be accessed via the first browser.

14. The client device of claim 10, wherein the instructions, when executed by the one or more processors, further cause the client device to:
send, to the first server device, a third request to modify one or more characteristics of a display area of the first browser; and
based on the third request, cause storage, in a data store associated with the first virtual session, of an indication of modification to the one or more characteristics of the display area of the first browser.

15. The client device of claim 10, wherein the instructions, when executed by the one or more processors, further cause the client device to determine, based on graphics requirements associated with the first web content, the second browser.

16. A non-transitory computer-readable medium storing instructions that, when executed by one or more processors, cause a client device to:
in a first virtual session between the client device and a first server device, send, to the first server device, a first request to access first web content via a first browser running on the first server device;
receive, from the first server device, a second request to access the first web content;
render the first web content on a first browser tab of a second browser running on the client device; and
render second web content, associated with a third browser running in a second virtual session between the client device and a second server device, on a second browser tab of the second browser.

17. The non-transitory computer-readable medium of claim 16, wherein the first browser comprises a virtual browser running on the first server device,
wherein the second browser comprises a local browser running on the client device, and
wherein the third browser comprises a secured browser that is hosted on a cloud network.

18. The non-transitory computer-readable medium of claim 16, wherein the instructions, when executed by the one or more processors, cause the client device to render the second web content by:
receiving, via the second virtual session, a screen update of the third browser; and
rendering the second web content based on the screen update.

19. The non-transitory computer-readable medium of claim 16, wherein the instructions, when executed by the one or more processors, cause the client device to receive the second request based on a determination that the first web content is not permitted to be accessed via the first browser.

20. The non-transitory computer-readable medium of claim 16, wherein the instructions, when executed by the one or more processors, further cause the client device to:
send, to the first server device, a third request to modify one or more characteristics of a display area of the first browser; and
based on the third request, cause storage, in a data store associated with the first virtual session, of an indication of modification to the one or more characteristics of the display area of the first browser.

* * * * *